US007934416B2

(12) United States Patent
Momose

(10) Patent No.: US 7,934,416 B2
(45) Date of Patent: May 3, 2011

(54) METHOD OF DETERMINING WHETHER LIQUID AMOUNT OR QUALITY OF LIQUID REAGENT IS NORMAL IN LIQUID-REAGENT-CONTAINING MICROCHIP AND LIQUID-REAGENT-CONTAINING MICROCHIP

(75) Inventor: Shun Momose, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 344 days.

(21) Appl. No.: 11/963,247

(22) Filed: Dec. 21, 2007

(65) Prior Publication Data

US 2008/0156079 A1 Jul. 3, 2008

(30) Foreign Application Priority Data

Dec. 27, 2006 (JP) ................................ 2006-352398P

(51) Int. Cl.
*G01N 37/00* (2006.01)

(52) U.S. Cl. ........................................................ 73/61.44

(58) Field of Classification Search .................. 73/61.41, 73/61.43, 61.44

See application file for complete search history.

(56) References Cited

U.S. PATENT DOCUMENTS 5,590,052 A 12/1996 Kopf-Sill et al. ............. 700/266
5,695,719 A * 12/1997 Lynggaard et al. ............. 422/81
7,347,617 B2 * 3/2008 Pugia et al. ................... 366/341
2001/0055812 A1 * 12/2001 Mian et al. ...................... 436/45
2005/0101028 A1 * 5/2005 Kawamura et al. ........... 436/164
2006/0094004 A1 * 5/2006 Nakajima et al. ................. 435/5
2008/0296734 A1 12/2008 Momose ........................ 257/618
2009/0084738 A1 4/2009 Momose ........................ 210/788
2009/0098658 A1 4/2009 Momose et al. .............. 436/164
2009/0104077 A1 4/2009 Momose ......................... 422/72
2009/0111675 A1 4/2009 Yokogawa et al. ............. 494/37
2009/0135407 A1 5/2009 Kageyama et al. ............. 356/39
2009/0142232 A1 6/2009 Okada et al. ..................... 422/72
2009/0155125 A1 6/2009 Michiue et al. ................ 422/100
2009/0232708 A1 9/2009 Yokogawa et al. ........... 422/102

FOREIGN PATENT DOCUMENTS

JP 04-329362 11/1992

OTHER PUBLICATIONS

U.S. Appl. No. 12/467,404, filed May 18, 2009.
U.S. Appl. No. 12/424,913, filed Apr. 16, 2009.

* cited by examiner

*Primary Examiner* — Hezron Williams
*Assistant Examiner* — Tamiko D Bellamy
(74) *Attorney, Agent, or Firm* — Fish & Richardson P.C.

(57) ABSTRACT

A method of determining whether a liquid amount and/or quality of a liquid reagent held in a reagent holding portion are/is normal or not in a microchip that includes the steps of measuring each liquid reagent held in the reagent holding portion with a first measuring portion, mixing, at least, two or more types of measured liquid reagents in a first mixing portion, and evaluating the liquid amount and/or quality of obtained liquid mixture and determining, based on the evaluation, whether or not the liquid amount and/or quality of the liquid reagents are/is normal, as well as a liquid-reagent-containing microchip are provided. A method of easily determining whether a liquid amount and/or quality of liquid reagents in a microchip are/is normal or not and a microchip in which the method can be performed are provided.

7 Claims, 5 Drawing Sheets

METHOD OF DETERMINING WHETHER LIQUID AMOUNT OR QUALITY OF LIQUID REAGENT IS NORMAL IN LIQUID-REAGENT-CONTAINING MICROCHIP AND LIQUID-REAGENT-CONTAINING MICROCHIP

BACKGROUND OF THE INVENTION

1. Field of the Invention

The present invention relates to a method of determining whether a liquid amount and/or quality of a contained liquid reagent are/is normal or not in a liquid-reagent-containing microchip, which is useful as μ-TAS (Micro Total Analysis System) or the like used for biochemical tests of DNA, protein, cell, immunity, blood, or the like, chemical synthesis, environmental analysis, and the like. In addition, the present invention relates to a liquid-reagent-containing microchip having a structure in which such determination can be made.

2. Description of the Background Art

A microchip having a hydraulic circuit inside has a small size, for example, of several cm square and several mm thickness. As compared with a series of experimental operations that have been performed in laboratories, the microchip has many advantages in that only a small amount of a sample and a reagent is required, cost is low, reaction speed is high, a test can be conducted with high throughput, and a test result can immediately be obtained at a site where the sample is taken. The microchip is suitably used, for example, for biochemical tests such as blood test.

Normally, a microchip contains a liquid reagent for treating a sample (such as blood) to be tested and/or analyzed or for mixing and reaction with a sample in advance in a chamber called a reagent holding portion in a hydraulic circuit, and the microchip normally contains and holds two or more types of liquid reagents in accordance with test items, in different reagent holding portions, respectively.

Normally, the microchip is required to be used for blood test or the like even after approximately six months to two years. An amount of the liquid reagent stored in the liquid-reagent-containing microchip is normally approximately from 1 to 100 μL. In order to hold such a very small amount of liquid reagent in the microchip for a long time, the microchip should be packed and sealed with a package material with high gas-barrier characteristics. Even though the microchip is sealed with a package material with high gas-barrier characteristics, possibility of decrease in the liquid reagent that has been contained in the microchip, for example, due to creation of a pin hole caused by damage of the package material during shipping or storage, cannot be denied.

In addition, if a resin such as PET (polyethylene teraphthalate) is used as a material for a substrate of the microchip, the liquid reagent that has been stored in the microchip gradually decreases due to water absorption and moisture absorption by the material for the substrate.

Accordingly, in particular when the liquid-reagent-containing microchip storing the liquid reagent in an amount as small as 1 to 100 μL for a long time is used, it is desirably guaranteed at the time of use that a necessary amount of liquid reagent has been stored in the microchip. Without such guarantee, for example, reliability of results of a test such as biochemical test is damaged.

For example, U.S. Pat. No. 5,590,052 describes a method of checking a liquid amount or the like of a contained liquid reagent at the time of use of a microchip and a microchip having a structure in which such a liquid amount or the like can be checked. More specifically, the publication describes a microchip including a chamber for checking a liquid amount or the like (hereinafter also referred to as an error checking portion). In addition, Japanese Patent Laying-Open No. 4-329362 describes an automatic analysis device including a comparison and determination portion determining whether a liquid amount is in a normal liquid amount state for quantification of a reagent component. The method of checking the liquid amount or the like described in these publications is directed to a method of checking a liquid reagent to be used for each type of the reagent, and in order to check a liquid amount or the like of a plurality of types of liquid reagents, checking should be carried out a plurality of times that correspond to the number of types of the liquid reagents. For example, if ten types of liquid reagents are contained in a single microchip, checking should be carried out ten times and ten error checking portions are necessary in the microchip.

Consequently, problems such as increase in a microchip area, a complicated test system, a larger size of a device, increase in the cost for the device, and increase in a test time for error checking arise.

SUMMARY OF THE INVENTION

The present invention was made to solve the above-described problems, and an object of the present invention is to provide a method of determining, in a simplified manner, whether a liquid amount and/or quality of a liquid reagent are/is normal or not in a microchip containing two or more types of liquid reagents.

In addition, another object of the present invention is to provide a liquid-reagent-containing microchip having a structure in which the method of determining whether a liquid amount and/or quality of a liquid reagent are/is normal or not can be performed.

The present inventor has conducted dedicated study on a method with which a liquid amount and/or quality of all of contained liquid reagents can be determined by performing error checking once as well as on a microchip structure in which such a method can be performed. Consequently, the present inventor has conceived that, initially, for guaranteeing reliability of results of tests and analyses such as biochemical tests conducted with the use of a microchip, it is not necessarily required to evaluate whether a liquid amount and/or quality of each of two or more types of contained liquid reagents are/is normal or not, and determination as to whether or not a liquid amount of any liquid reagent out of the two or more types of liquid reagents is insufficient and/or whether or not quality thereof has deteriorated should only be made. This is because, if the liquid amount and/or quality of any one of a plurality of types of liquid reagents are/is determined as not normal, determination that obtained results of tests and analyses lack reliability may be made.

In addition, the present inventor has conceived that, if determination as to whether a liquid amount and/or quality of any liquid reagent are/is abnormal or whether a liquid amount and/or quality of all liquid reagents are/is normal can be made by evaluating a liquid amount and/or quality of a liquid mixture which is prepared for test and analysis of the sample (such as blood) by mixing the sample or a specific component in the sample and the liquid reagent together, the liquid amount and/or quality of all liquid reagents that have been contained can be guaranteed by checking the liquid amount and/or quality once simultaneously with the test and analysis of the sample. The present invention was made based on such concepts.

Namely, the present invention is directed to a method of determining whether a liquid amount and/or quality of a liquid reagent held in a reagent holding portion are/is normal or not in a liquid-reagent-containing microchip including, at least, two or more reagent holding portions for holding two or more types of liquid reagents respectively, two or more first measuring portions for measuring the two or more types of liquid reagents respectively, and a first mixing portion for mixing the two or more types of liquid reagents measured with the first measuring portions, including the steps of:

(A) measuring each liquid reagent held in the reagent holding portion with the first measuring portion;

(B) mixing, at least, two or more types of measured liquid reagents in the first mixing portion; and (C) evaluating a liquid amount and/or quality of a liquid mixture obtained in the step (B) and determining whether the liquid amount and/or quality of the liquid reagents held in the reagent holding portions are/is normal or not, based on the evaluation.

Here, evaluation of the liquid amount and/or quality of the liquid mixture in the step (C) above may be carried out for the liquid mixture held in the first mixing portion.

In addition, the microchip may further include a detection portion connected to the first mixing portion via a flow path, for analyzing and/or testing the liquid mixture, and evaluation of the liquid amount and/or quality of the liquid mixture in the step (C) above may be carried out for the liquid mixture held in the detection portion.

Alternatively, the microchip may further include a detection portion connected to the first mixing portion via a flow path, for analyzing and/or testing the liquid mixture, and a liquid mixture holding portion coupled to the flow path connecting the first mixing portion and the detection portion to each other, and evaluation of the liquid amount and/or quality of the liquid mixture in the step (C) above may be carried out for the liquid mixture held in the liquid mixture holding portion.

Further alternatively, the microchip may further include two or more second measuring portions different from the first measuring portions, for measuring the two or more types of liquid reagents respectively and a second mixing portion different from the first mixing portion, for mixing the two or more types of liquid reagents measured with the second measuring portions, and evaluation of the liquid amount and/or quality of the liquid mixture in the step (C) may be carried out for the liquid mixture containing the two or more types of liquid reagents obtained as a result of measurement with the second measuring portions and mixing in the second mixing portion.

In addition, the present invention provides a liquid-reagent-containing microchip including: two or more reagent holding portions for holding two or more types of liquid reagents respectively; two or more first measuring portions for measuring the two or more types of liquid reagents respectively; a first mixing portion for mixing the two or more types of liquid reagents measured with the first measuring portions; a detection portion connected to the first mixing portion via a flow path, for analyzing and/or testing a liquid mixture obtained as a result of mixing; and a liquid mixture holding portion coupled to the flow path connecting the first mixing portion and the detection portion to each other; for evaluating a liquid amount and/or quality of the liquid mixture.

Moreover, the present invention provides a liquid-reagent-containing microchip including: two or more reagent holding portions for holding two or more types of liquid reagents respectively; two or more first measuring portions for measuring the two or more types of liquid reagents respectively; a first mixing portion for mixing the two or more types of liquid reagents measured with the first measuring portions; two or more second measuring portions for measuring the two or more types of liquid reagents respectively; and a second mixing portion for mixing the two or more types of liquid reagents measured with the second measuring portions and evaluating a liquid amount and/or quality of an obtained liquid mixture.

According to the method and the liquid-reagent-containing microchip of the present invention, the liquid amount and/or quality of all of two or more types of liquid reagents contained in the microchip can be guaranteed by performing checking only once. In addition, according to the liquid-reagent-containing microchip of the present invention, a single chamber (error checking portion) for evaluating the liquid amount and/or quality is only necessary. Consequently, as compared with an example where error check should be carried out a plurality of times, (1) lower cost, smaller space, low energy consumption, and improvement in handling, of the microchip owing to a smaller area of the microchip, (2) a simplified test system, (3) smaller size and lower cost of a test device, (4) shorter test time for error checking, and the like can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
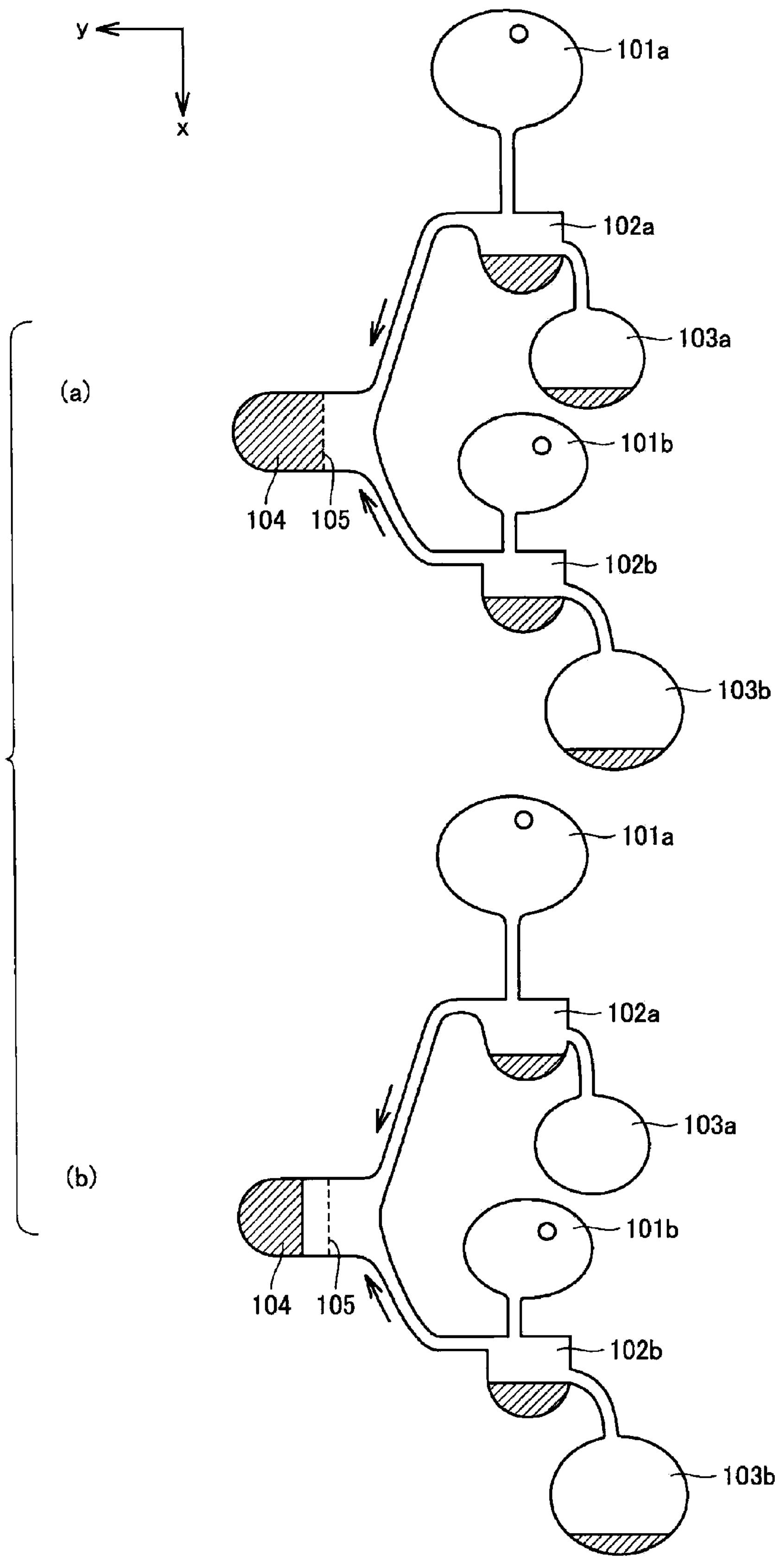
FIG. 1 is a schematic diagram for illustrating an example of a method according to the present invention.

The present invention is directed to the invention relating to a liquid-reagent-containing microchip. Here, the "liquid-reagent-containing microchip" refers to a microchip holding in advance in the microchip a liquid reagent for treating a sample (such as blood) to be tested and analyzed with the use of the microchip or for reaction with the sample. The liquid-reagent-containing microchip according to the present invention has a hydraulic circuit inside, and the hydraulic circuit includes, at least, two or more reagent holding portions for holding two or more types of liquid reagents respectively, two or more first measuring portions for measuring the two or more types of liquid reagents respectively, and a first mixing portion for mixing the two or more types of liquid reagents measured with the first measuring portions. Typically, the microchip further includes a detection portion for analyzing and/or testing a liquid mixture obtained by treating the sample to be tested and analyzed with the liquid reagent or obtained as a result of reaction of the sample with the liquid reagent. These portions above are arranged at appropriate positions and connected to each other via a thin flow path such that measurement of the sample and the liquid reagent, mixing of the sample with each type of liquid reagent, test and analysis of the liquid mixture, and the like can successively be performed by externally applying centrifugal force. Though test and analysis of the liquid mixture (such as detection of a specific component in the liquid mixture) is conducted, for example, by irradiating the detection portion with light and measuring intensity of emitted transmitted light or measuring absorption spectrum of the liquid mixture held in the detection portion, it is not limited as such.

The microchip having the hydraulic circuit inside can be fabricated, for example, by attaching a second substrate to a surface of a first substrate where grooves are formed, the first substrate including grooves in an appropriate pattern on one surface. Here, the hydraulic circuit is constituted of grooves in the first substrate and the surface of the second substrate.

The present invention provides a reasonable and simplified method of determining whether or not a liquid amount and/or quality of two or more types of liquid reagents held in different reagent holding portions in a microchip have/has been maintained normal in a liquid-reagent-containing microchip as above, as well as a liquid-reagent-containing microchip having a specific hydraulic circuit, in which such a determination method can be performed.

Namely, the method according to the present invention is reasonable in that test and analysis of a sample to be tested, which is the original purpose, can be performed with the use of the liquid-reagent-containing microchip, determination as to whether a liquid amount and/or quality of two or more types of liquid reagents are/is normal or not can be made, and in addition, the liquid amount and/or quality can be checked by using a liquid mixture the same as that used for the test and analysis, which is the original purpose. In addition, the method according to the present invention is simple in that determination as to whether the liquid amount and/or quality of all of two or more types of liquid reagents are/is normal or not can be made by checking the liquid amount and/or quality of the liquid mixture only once.

Here, the liquid amount of the liquid reagent being "normal" means that at least an amount to be measured in each measuring portion, that is, an amount necessary for test and analysis of the sample, of all of two or more types of liquid reagents that have been held in the microchip, is maintained at the time of use of the microchip. The liquid amount of the liquid reagent being "not normal" means that an amount to be measured in each measuring portion, that is, an amount necessary for test and analysis of the sample, of any liquid reagent out of the two or more types of liquid reagents that have been held in the microchip, is insufficient. In addition, quality of the liquid reagent being "normal" means that a function to be attained by the liquid reagent, that is, capability to treat the sample to be tested or capability of reaction with the sample, of all of the two or more types of liquid reagents that have been held in the microchip, is ensured.

The present invention will be described hereinafter in detail with reference to embodiments.

First Embodiment

FIG. 1 is a schematic diagram for illustrating an example of a method according to the present invention, and it is a diagram schematically showing a part of a hydraulic circuit in the liquid-reagent-containing microchip to be used. Though FIG. 1 shows a microchip containing two types of liquid reagents, however, the embodiment is not limited thereto and two or more types should only be contained. FIG. 1(*a*) shows an example where a liquid amount of the liquid reagent is determined as normal, while FIG. 1(*b*) shows an example where a liquid amount of the liquid reagent is determined as not normal.

FIG. 1(*a*) will now be described. Initially, by applying centrifugal force in x direction in FIG. 1 to the microchip, two types of liquid reagents that have been held in reagent holding portions 101*a* and 101*b* respectively are transported to first measuring portions 102*a* and 102*b* respectively and measurement is performed therein (step (A)). The liquid reagents exceeding a capacity of first measuring portions 102*a* and 102*b* are stored in liquid waste storing portions 103*a* and 103*b* respectively. Thereafter, the measured two types of liquid reagents are transported to a first mixing portion 104 by applying centrifugal force in y direction in FIG. 1 to the microchip and mixing is performed therein (step (B)). Thereafter, the liquid amount of the resultant liquid mixture in first mixing portion 104 is evaluated, and determination as to whether the liquid amount of the liquid reagents that have been held in reagent holding portions 101*a* and 101*b* is normal or not is made based on the evaluation (step (C)).

In the present embodiment, the liquid amount of all liquid reagents is determined as "normal" if a liquid level of the obtained liquid mixture in first mixing portion 104 matches with a predetermined liquid level 105. In the example in FIG. 1(*a*), the predetermined liquid level refers to a liquid level in first mixing portion 104 indicated by the total volume of liquid reagents to be measured with first measuring portions 102*a* and 102*b*. Namely, if the volume of the liquid mixture obtained in first mixing portion 104 is the same as the total amount of the liquid reagents to be measured with first measuring portions 102*a* and 102*b*, it is guaranteed that the amount to be measured in each measuring portion, that is, the amount necessary for test and analysis, of all liquid reagents, has been maintained. By thus checking the liquid amount of the liquid mixture only once, whether or not the liquid amount of all liquid reagents that have been contained is normal or not can be determined.

On the other hand, as shown in FIG. 1(*b*), if any liquid reagent is insufficient (FIG. 1(*b*) shows an example where the liquid reagent that has been held in reagent holding portion 101*a* is insufficient), the liquid level of the obtained liquid mixture in first mixing portion 104 is not as high as predetermined liquid level 105. Therefore, the liquid amount of the liquid reagent is determined as "not normal".

Here, determination as to whether the liquid level of the liquid mixture in first mixing portion 104 matches with predetermined liquid level 105 or whether it is not as high as predetermined liquid level 105 can be made, for example, by irradiating a position of liquid level 105 with light such as visible light and detecting transmitted light with a photodetector (PD) or the like. In addition, determination as to whether quality of the liquid reagent that has been held in the reagent holding portion is normal or not can be made by irradiating first mixing portion 104 with light such as visible light to obtain absorption spectrum (or absorbance at a specific wavelength) and checking whether the obtained absorption spectrum (or absorbance at a specific wavelength) is the same as absorption spectrum (or absorbance at a specific wavelength) of a liquid mixture of which quality is normal.

Second Embodiment

Figure 2:
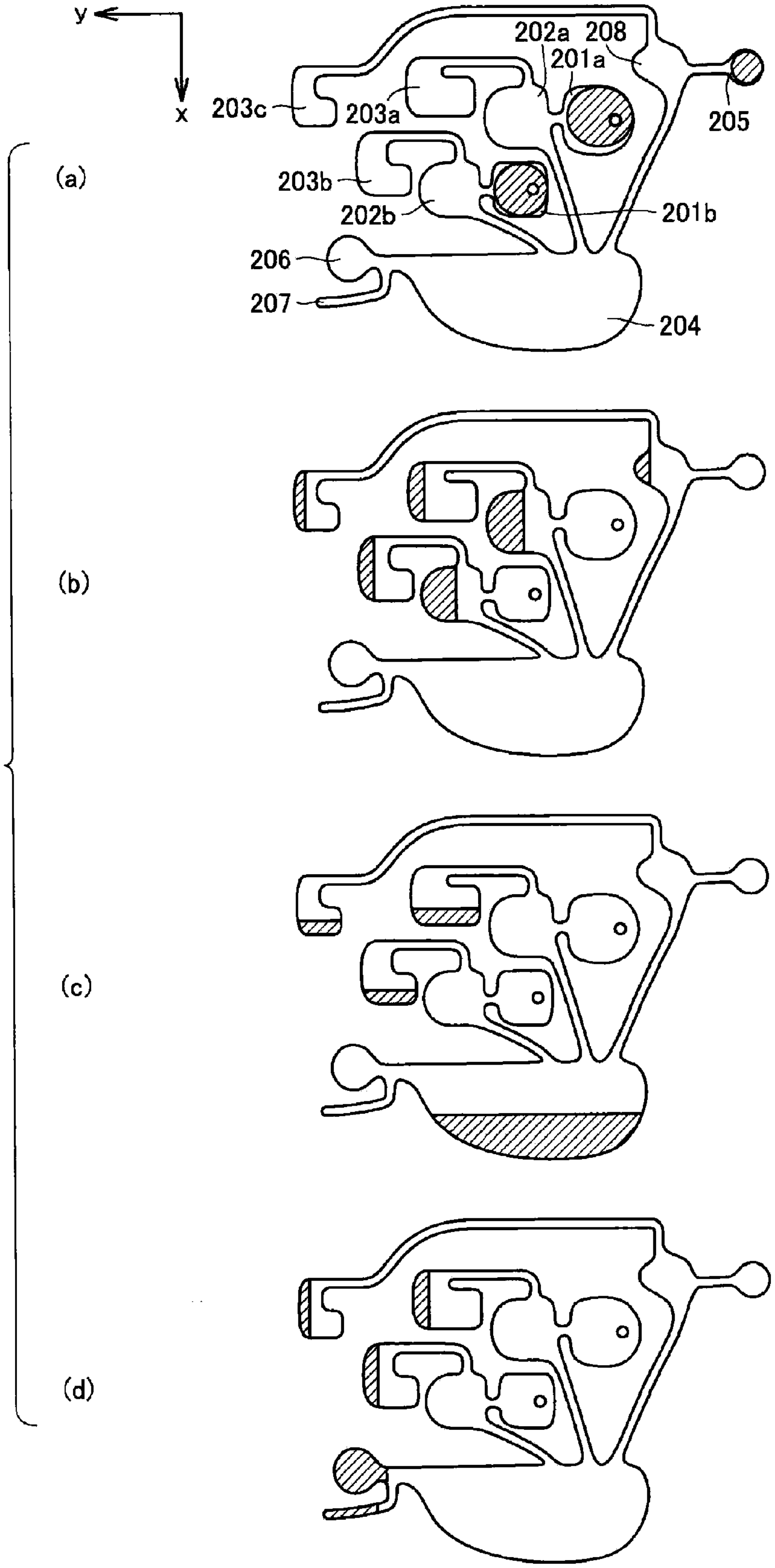
FIG. 2 is a schematic process diagram showing another example of the method according to the present invention and a schematic diagram showing an example of a hydraulic circuit included in a liquid-reagent-containing microchip according to the present invention.

FIG. 2 is a schematic process diagram showing another example of the method according to the present invention and a schematic diagram showing an example of the hydraulic circuit included in the liquid-reagent-containing microchip according to the present invention. The method and the liquid-reagent-containing microchip shown in FIG. 2 will be described hereinafter.

The liquid-reagent-containing microchip in FIG. 2 includes reagent holding portions 201*a* and 201*b* for holding two types of liquid reagents, first measuring portions 202*a* and 202*b* for measuring respective liquid reagents, liquid waste storing portions 203*a* and 203*b* receiving the liquid reagents overflowing at the time of measurement, a sample injection portion 205 for injecting the sample to be tested into the hydraulic circuit, a sample measuring portion 208 for measuring the sample, a liquid waste storing portion 203*c* receiving the sample overflowing at the time of measurement of the sample, a first mixing portion 204 for mixing the measured sample and the measured two types of liquid reagents, a detection portion 206 for testing and analyzing an obtained liquid mixture, and a liquid mixture holding portion 207 coupled to a flow path connecting first mixing portion 204 and detection portion 206 to each other, for checking the liquid amount and/or quality of the liquid mixture.

In the present embodiment, initially, after the sample is injected from sample injection portion 205 (see FIG. 2(*a*)), centrifugal force in y direction in FIG. 2 is applied to the microchip. Thus, the two types of liquid reagents that have been held in reagent holding portions 201*a* and 201*b* are transported to first measuring portions 202*a* and 202*b* respectively and measured therein, and the sample injected from sample injection portion 205 is transported to sample measuring portion 208 and measured therein (step (A), FIG. 2(*b*)). Thereafter, by applying centrifugal force in x direction in FIG. 2 to the microchip, the measured sample and the two types of liquid reagents are transported to first mixing portion 204 and mixed therein (step (B), FIG. 2(*c*)). Thereafter, by applying centrifugal force in y direction to the microchip, the liquid mixture in first mixing portion 204 is transported to detection portion 206 and liquid mixture holding portion 207 (FIG. 2(*d*)). The liquid mixture transported to detection portion 206 is subjected to liquid mixture test and analysis, which is the original purpose of use of the microchip.

Then, the liquid amount and/quality of the liquid mixture introduced in liquid mixture holding portion 207 is evaluated, and determination as to whether the liquid amount and/or quality of the liquid reagents that have been held in reagent holding portions 201*a* and 201*b* are/is normal or not is made based on the evaluation (step (C)). A method of evaluating the liquid amount and quality and evaluation criteria on which determination as to whether the liquid amount and quality of the liquid reagent is normal or not is based in the present embodiment will be described hereinafter in detail.

(As to Evaluation of Liquid Amount of Liquid Mixture and Determination as to Whether Liquid Amount of Liquid Reagent is Normal or not Based on Evaluation)

In the present embodiment, as in the first embodiment above, the liquid amount of all liquid reagents is determined as "normal" if a liquid level of the liquid mixture in liquid mixture holding portion 207 matches with a predetermined liquid level. Here, the predetermined liquid level refers to a liquid level in liquid mixture holding portion 207, indicated by the total amount of the liquid reagents to be measured with first measuring portions 202*a* and 202*b* and the sample to be measured with sample measuring portion 208 when the total amount thereof is transported to detection portion 206 and liquid mixture holding portion 207. Determination as to whether the liquid level of the liquid mixture matches with the predetermined liquid level or whether it is not as high as the predetermined liquid level can be made as in the first embodiment above. Thus, by providing the liquid mixture holding portion within the microchip at such a position that the liquid mixture is transported to the detection portion and also introduced into the liquid mixture holding portion and by evaluating the liquid amount of the liquid mixture held in the liquid mixture holding portion, test and analysis of the liquid mixture in the detection portion and checking of the liquid amount of the liquid reagent can be performed simultaneously or in parallel.

Figure 3:
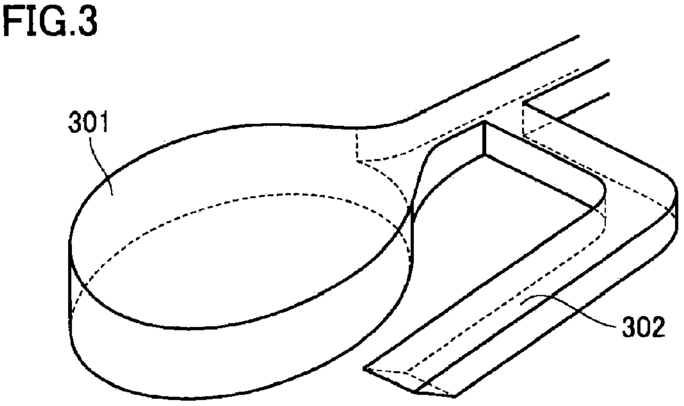
FIG. 3 is a schematic diagram showing an example of a structure of a liquid mixture holding portion according to the present invention.
Figure 4:
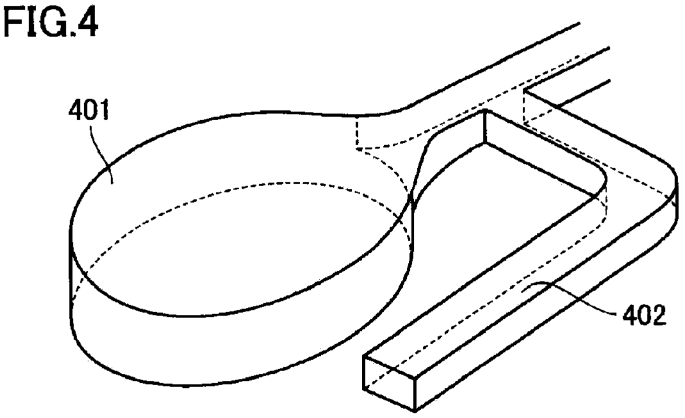
FIG. 4 is a schematic diagram showing another example of the structure of the liquid mixture holding portion according to the present invention.

The shape of liquid mixture holding portion 207 when determination as to whether the liquid amount of the liquid reagent is normal or not is made in the present embodiment is not particularly limited. For example, a shape as shown in FIG. 3 (a liquid mixture holding portion 302 in FIG. 3) or a shape of a quadrangular prism as shown in FIG. 4 (a liquid mixture holding portion 402 in FIG. 4) may be adopted. Liquid mixture holding portion 302 shown in FIG. 3 is coupled to a flow path connecting a first mixing portion (not shown) and a detection portion 301 to each other. In addition, liquid mixture holding portion 402 shown in FIG. 4 is coupled to a flow path connecting a first mixing portion (not shown) and a detection portion 401 to each other. Details of liquid mixture holding portion 302 will be described later.

(As to Evaluation of Quality of Liquid Mixture and Determination as to Whether Quality of Liquid Reagent is Normal or not Based on Evaluation)

A method of determining whether quality of the liquid reagent is normal or not in the present embodiment is a method of evaluating quality of the liquid mixture in liquid mixture holding portion 207 and determining whether quality of the liquid reagent is normal or not based on the evaluation. Evaluation of the quality of the liquid mixture can be made, for example, by irradiating liquid mixture holding portion 207 with detection light such as visible light to measure absorption spectrum (or absorbance at a specific wavelength), and comparing the measured absorption spectrum with absorption spectrum (or absorbance at a specific wavelength) set in advance. Here, if matching of the absorption spectrum is achieved or if matching of absorbance at least one specific wavelength is achieved, quality of all liquid reagents that have been held in the reagent holding portions is determined as normal. In contrast, if the measured absorption spectrum is different from the absorption spectrum (or absorbance at a specific wavelength) set in advance, it is determined that at least one type of liquid reagent has deteriorated. Here, the absorption spectrum (or absorbance at a specific wavelength) set in advance refers, for example, to absorption spectrum (or absorbance at a specific wavelength) of a liquid mixture obtained by mixing a new liquid reagent and a sample. By thus checking the quality of the liquid mixture only once, determination as to whether quality of all liquid reagents that have been contained is normal or not can be made.

The shape of liquid mixture holding portion 207 when determination as to whether quality of the liquid reagent is normal or not is made in the present embodiment is not particularly limited. For example, a shape as shown in FIG. 3

(liquid mixture holding portion 302 in FIG. 3) which will be described later or a shape of a quadrangular prism as shown in FIG. 4 (liquid mixture holding portion 402 in FIG. 4) may be adopted.

Alternatively, checking of the liquid amount and checking of quality can also simultaneously be carried out by irradiating the predetermined liquid level with detection light so as to obtain absorption spectrum (or absorbance at a specific wavelength).

Third Embodiment

A method of determining whether the liquid amount of the liquid reagent is normal or not in the present embodiment is the same as in the second embodiment above up to step (B). Referring to FIG. 2, the present embodiment is different from the second embodiment above in that determination as to whether the liquid amount of the liquid reagents that have been held in respective reagent holding portions 201*a* and 201*b* is normal or not in step (C) is made based on presence/absence of the liquid mixture in liquid mixture holding portion 207. Specifically, if the liquid mixture is determined as present in liquid mixture holding portion 207, the liquid amount of all liquid reagents is determined as "normal". A capacity of detection portion 206 is set such that it is slightly smaller than the total amount of the liquid reagents to be measured with first measuring portions 202*a* and 202*b* and the sample to be measured with sample measuring portion 208. Accordingly, if the liquid amount of all liquid reagents is "normal", the liquid mixture transported from first mixing portion 204 slightly overflows from detection portion 206 and reaches liquid mixture holding portion 207. Therefore, if overflow of a "small amount" of the liquid mixture to liquid mixture holding portion 207 is confirmed, it is guaranteed that the amount to be measured with each measuring portion, that is, the amount necessary for test and analysis, of all liquid reagents, has been maintained. In contrast, if absence of the liquid mixture in liquid mixture holding portion 207 is confirmed, the liquid amount of the liquid reagent is determined as "not normal". With this method as well, by checking the liquid amount of the liquid mixture only once, determination as to whether the liquid amount of all liquid reagents that have been contained is normal or not can be made.

Here, FIG. 3 shows a schematic diagram showing a structure of a liquid mixture holding portion suitably applied in the present embodiment. Liquid mixture holding portion 302 shown in FIG. 3 is coupled to the flow path connecting the first mixing portion (not shown) and detection portion 301 to each other and it has a tip end portion cut diagonally. Such a structure of the diagonally cut tip end portion represents an example of a structure suitably used in the method. Specifically, where the liquid mixture holding portion has such a structure of the tip end portion, a method utilizing the fact that an optical path of light emitted to a cut surface of the tip end portion of the liquid mixture holding portion changes depending on presence/absence of the liquid mixture can be adopted as the method of determining whether the liquid mixture is present in the liquid mixture holding portion. More specifically, a method of detecting reflected light or transmitted light of light emitted to the cut surface of the tip end portion of the liquid mixture holding portion with a photodetector (PD) can be given as an example.

Figure 5:
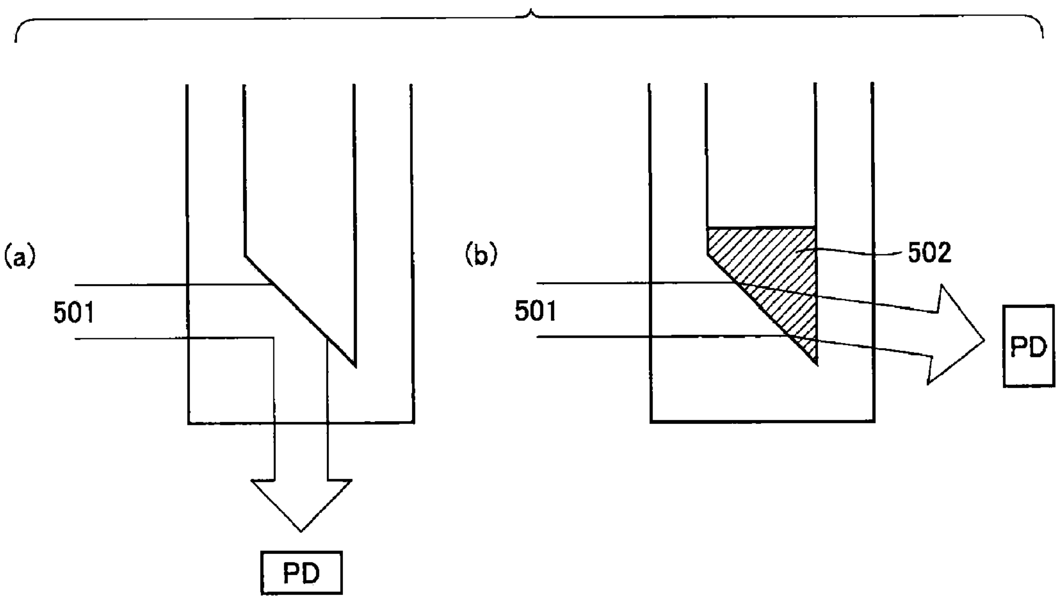
FIG. 5 is a conceptual diagram showing a method of confirming presence/absence of a liquid mixture in the liquid mixture holding portion when the liquid mixture holding portion in FIG. 3 is employed.

FIG. 5 is a conceptual diagram showing a method of confirming presence/absence of the liquid mixture in liquid mixture holding portion 302 when liquid mixture holding portion 302 shown in FIG. 3 is employed. FIG. 5(*a*) conceptually shows a reflection angle of detection light in an example where the tip end cut surface is irradiated with detection light 501 while the liquid mixture is absent at the tip end portion of liquid mixture holding portion 302, while FIG. 5(*b*) conceptually shows a reflection angle of detection light in an example where the tip end cut surface is irradiated with detection light 501 while a liquid mixture 502 is present at the tip end portion of liquid mixture holding portion 302. As index of refraction of the emitted detection light is different depending on presence/absence of the liquid mixture, the optical path of the detection light differs. Utilizing the difference, whether the liquid mixture is present in liquid mixture holding portion 302 or not can be confirmed.

Here, in confirming presence/absence of the liquid mixture by utilizing the difference in the optical path of the detection light, determination that the liquid mixture is present can be made if the liquid mixture in an amount sufficient to fill a triangular prism portion at the tip end portion of liquid mixture holding portion 302 is present. Specifically, referring to FIG. 3, the amount of the liquid mixture that overflows from detection portion 301 and reaches liquid mixture holding portion 302 (referred to as a "small amount" above) should be just enough to fill the triangular prism portion. The volume of the triangular prism portion can be set, for example, to approximately 1 mm×1 mm×1 mm×½=0.5 $mm^3$ (μL) to 0.1 mm×0.1 mm×0.4 mm×½=$2\times10^{-3}$ $mm^3$ (μL). The total amount of the liquid reagents that is normally used is set to approximately 10 μL to 500 μL, and the volume of the triangular prism portion is set to approximately $4\times10^{-4}$% to 5% of the total amount of the liquid reagents. Therefore, according to the present embodiment, whether the liquid amount of the liquid reagent is normal or not can be determined with very high accuracy.

Fourth Embodiment

Figure 6:
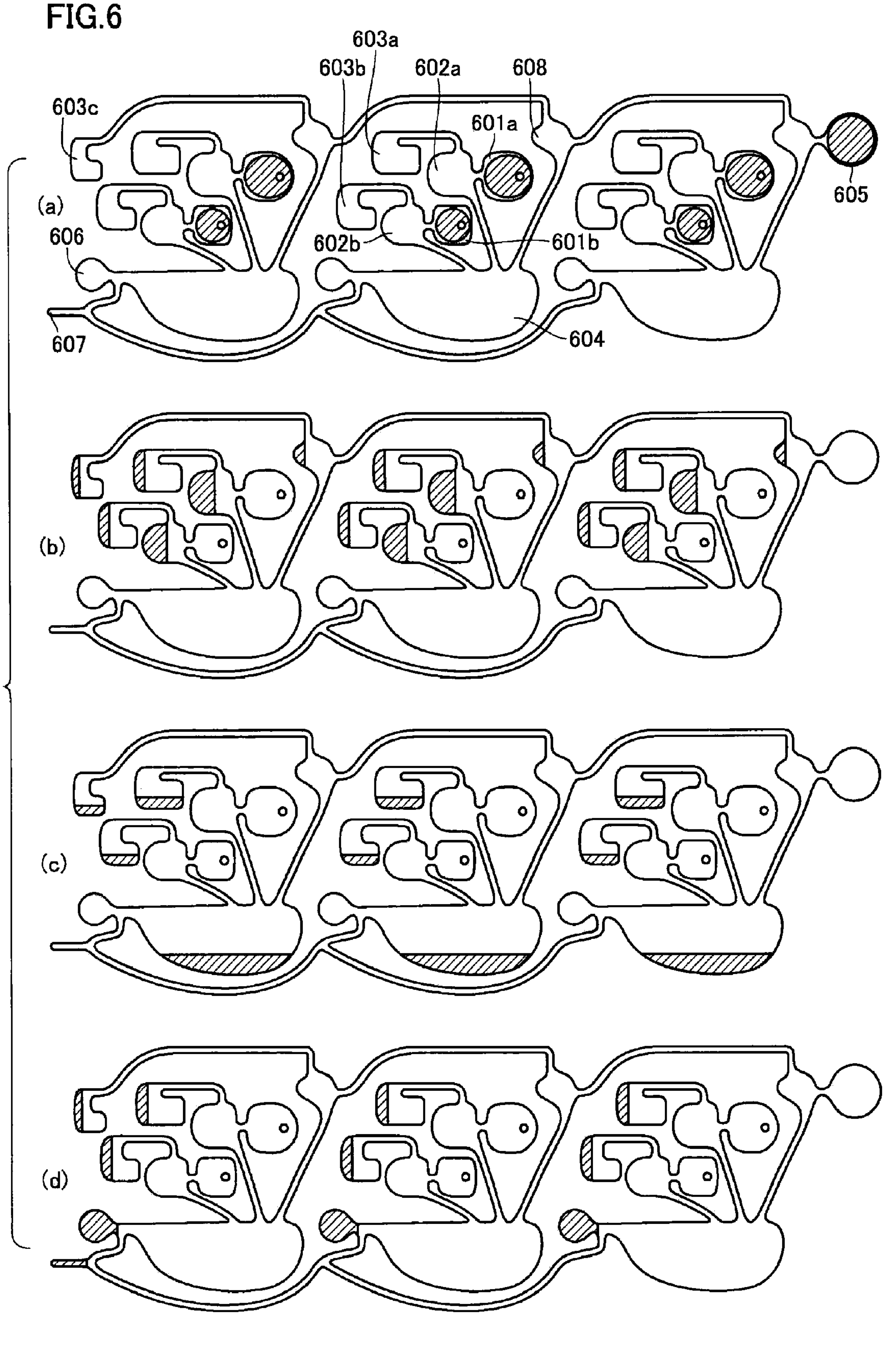
FIG. 6 is a schematic process diagram showing another example of the method according to the present invention and a schematic diagram showing another example of the hydraulic circuit in the liquid-reagent-containing microchip according to the present invention.

FIG. 6 is a schematic process diagram showing another example of the method according to the present invention and a schematic diagram showing another example of the hydraulic circuit included in the liquid-reagent-containing microchip according to the present invention. The microchip shown in FIG. 6 has a hydraulic circuit implemented by coupling three hydraulic circuits included in the microchip shown in FIG. 2. More specifically, the liquid-reagent-containing microchip in FIG. 6 includes the total of six reagent holding portions 601*a* and 601*b* for holding liquid reagents, the total of six first measuring portions 602*a* and 602*b* for measuring the respective liquid reagents, the total of six liquid waste storing portions 603*a* and 603*b* receiving the liquid reagents overflowing at the time of measurement, a sample injection portion 605 for injecting the sample to be tested into the hydraulic circuit, the total of three sample measuring portions 608 for measuring the sample, a liquid waste storing portion 603*c* receiving the sample overflowing at the time of measurement of the sample, the total of three first mixing portions 604 for mixing the measured sample and the measured liquid reagents, the total of three detection portions 606 for testing and analyzing the obtained liquid mixture, and one liquid mixture holding portion 607 coupled to a flow path connecting first mixing portion 604 and detection portion 606 to each other, for checking the liquid amount and/or quality of the liquid mixture.

According to the microchip including the hydraulic circuit structured as above, three types of tests and analyses of one sample can be conducted within a single microchip. In the liquid-reagent-containing microchip structured as such as well, determination as to whether the liquid amount and/or quality of the liquid reagent are/is normal or not can be made as in the second and third embodiments described above. It is noted that description of FIGS. 6(*a*) to 6(*d*) is not provided, as it is the same as the description of FIGS. 2(*a*) to 2(*d*).

Fifth Embodiment

Figure 7:
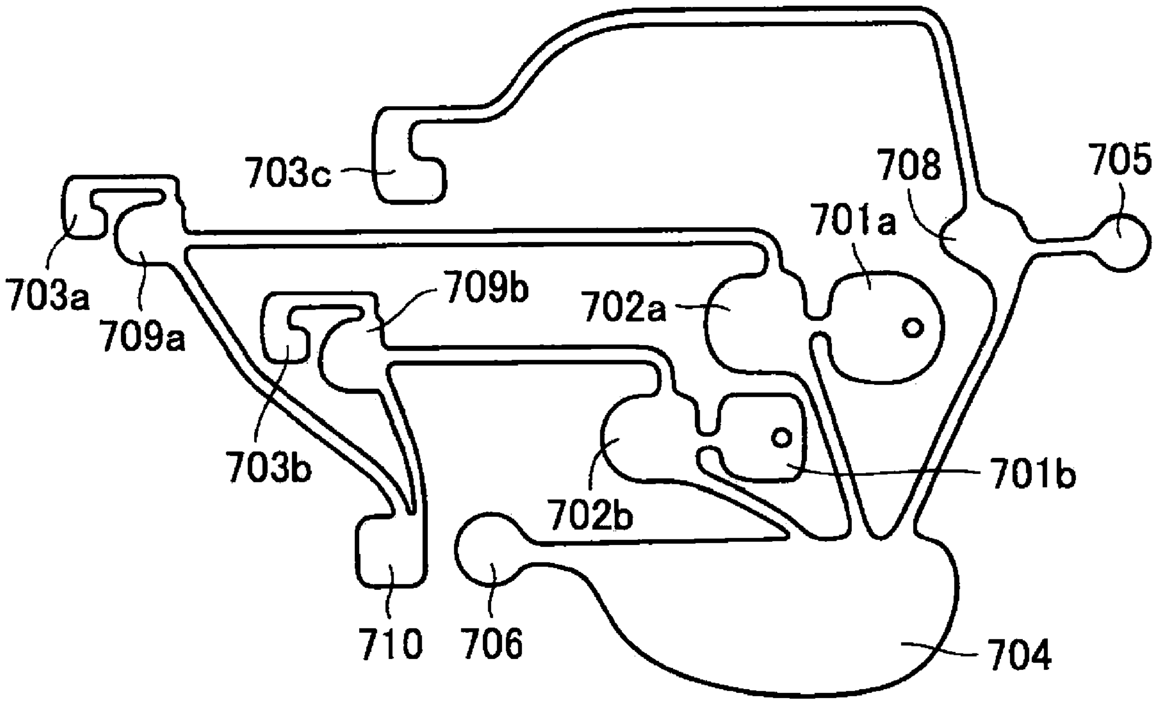
FIG. 7 is a schematic diagram showing another example of the hydraulic circuit included in the liquid-reagent-containing microchip according to the present invention.

FIG. 7 is a schematic diagram showing another example of the hydraulic circuit included in the liquid-reagent-containing microchip according to the present invention. The liquid-reagent-containing microchip shown in FIG. 7 includes reagent holding portions 701*a* and 701*b* for holding liquid reagents, first measuring portions 702*a* and 702*b* for measuring the respective liquid reagents, liquid waste storing portions 703*a* and 703*b* receiving the respective liquid reagents overflowing at the time of measurement, a sample injection portion 705 for injecting the sample to be tested into the hydraulic circuit, a sample measuring portion 708 for measuring the sample, a liquid waste storing portion 703*c* receiving the sample overflowing at the time of measurement of the sample, a first mixing portion 704 for mixing the measured sample and the measured liquid reagents, a detection portion 706 for testing and analyzing the obtained liquid mixture, second measuring portions 709*a* and 709*b* provided between first measuring portion 702*a* and liquid waste storing portion 703*a* and between first measuring portion 702*b* and liquid waste storing portion 703*b* respectively, and a second mixing portion 710 connected to second measuring portions 709*a* and 709*b*.

According to such a structure of the hydraulic circuit, by applying centrifugal force to the left in FIG. 7 to the microchip, the two types of liquid reagents that have been held in reagent holding portions 701*a* and 701*b* are measured with first measuring portions 702*a* and 702*b* respectively and also measured with second measuring portions 709*a* and 709*b* respectively. Thereafter, by applying centrifugal force downward in FIG. 7 to the microchip, the two types of liquid reagents measured with first measuring portions 702*a* and 702*b* respectively are transported to first mixing portion 704 and mixed therein, and the two types of liquid reagents measured with second measuring portions 709*a* and 709*b* respectively are transported to second mixing portion 710 and mixed therein.

In the present embodiment, evaluation of the liquid amount and/or quality of the liquid mixture in second mixing portion 710 is made and determination as to whether the liquid amount and/or quality of the liquid reagents that have been held in the reagent holding portions are/is normal or not is made, based on the evaluation. Determination as to the liquid amount can be made as in the first embodiment above. Namely, if the liquid level of the obtained liquid mixture in second mixing portion 710 matches with the predetermined liquid level, the liquid amount of all liquid reagents is determined as "normal". The predetermined liquid level refers to a liquid level in second mixing portion 710, indicated by the total volume of the liquid reagents to be measured with second measuring portions 709*a* and 709*b*.

In addition, determination as to quality can be made as in the second embodiment above. Specifically, determination is made, for example, by irradiating second mixing portion 710 with detection light such as visible light to measure absorption spectrum (or absorbance at a specific wavelength), and comparing the measured absorption spectrum (or absorbance at a specific wavelength) with absorption spectrum (or absorbance at a specific wavelength) set in advance. Here, if matching of the absorption spectrum (or absorbance at a specific wavelength) is achieved, quality of all liquid reagents that have been held in the reagent holding portions is determined as normal. Here, the absorption spectrum (or absorbance at a specific wavelength) set in advance refers, for example, to absorption spectrum (or absorbance at a specific wavelength) of a liquid mixture obtained by mixing new liquid reagents.

The liquid amount and/or quality of the liquid mixture are/is checked in second mixing portion 710. Therefore, though the microchip shown in FIG. 7 does not have a liquid mixture holding portion, it may have a liquid mixture holding portion.

<Modification>

Various modifications of the embodiments above may be encompassed, without departing the scope of the present invention. For example, in the second embodiment above, referring to FIG. 2, the liquid amount and/or quality of the liquid mixture in liquid mixture holding portion 207, that has overflowed from detection portion 206, are/is evaluated. Here, evaluation of the liquid amount and/or quality of the liquid mixture in detection portion 206 and determination as to whether the liquid amount and/or quality of the liquid reagent are/is normal or not may be made, with the capacity of detection portion 206 being increased. Here, determination as to the liquid amount can be made as in the first embodiment above. In addition, determination as to quality can be made as in the second embodiment above. Moreover, when modification as above is made, the microchip does not necessarily have to include a liquid mixture holding portion.

Alternatively, the liquid-reagent-containing microchip according to the present invention may have, as a part of the hydraulic circuit, a portion not shown in the embodiment above. For example, the liquid-reagent-containing microchip may include an isolation portion or the like, for isolating a specific component (such as plasma component in blood) from a sample introduced in the microchip.

Although the present invention has been described and illustrated in detail, it is clearly understood that the same is by way of illustration and example only and is not to be taken by way of limitation, the scope of the present invention being limited only by the terms of the appended claims.

What is claimed is:

1. A method of determining whether a liquid amount and quality of a liquid reagent held in a reagent holding portion are normal in a liquid-reagent-containing microchip utilizing centrifugal force to analyze or test a sample, the microchip including, at least, two or more reagent holding portions for holding two or more types of liquid reagents respectively, two or more first measuring portions for measuring said two or more types of liquid reagents respectively, and a first mixing portion for mixing the two or more types of liquid reagents measured with said first measuring portions, the method comprising the steps of:

(A) measuring each liquid reagent held in said reagent holding portions of the microchip with said first measuring portions;

(B) mixing, at least, two or more types of measured liquid reagents in said first mixing portion of the microchip; and (C) evaluating a liquid amount and quality of a liquid mixture obtained in said step (B) and determining whether the liquid amount and quality of the liquid reagents held in said reagent holding portions of the microchip are normal, based on the evaluation, wherein evaluating the liquid amount of the liquid mixture in said step (C) includes detecting whether a liquid level of the liquid mixture matches a predetermined liquid level.

2. The method according to claim 1, wherein evaluation of the liquid amount and quality of the liquid mixture in said step (C) is carried out for the liquid mixture held in said first mixing portion, wherein evaluating the liquid amount of the liquid mixture in said step (C) includes detecting whether a liquid level of the liquid mixture in the first mixing portion matches a predetermined liquid level.

3. The method according to claim 1, wherein said liquid-reagent-containing microchip further includes a detection portion connected to said first mixing portion via a flow path, for analyzing or testing said liquid mixture, and evaluation of the liquid amount and quality of the liquid mixture in said step (C) is carried out for the liquid mixture held in said detection portion, wherein evaluating the liquid amount of the liquid mixture in said step (C) includes detecting whether a liquid level of the liquid mixture in the detection portion matches a predetermined liquid level.

4. The method according to claim 1, wherein said liquid-reagent-containing microchip further includes a detection portion connected to said first mixing portion via a flow path, for analyzing or testing said liquid mixture, and a liquid mixture holding portion coupled to the flow path connecting said first mixing portion and said detection portion to each other, and evaluation of the liquid amount and quality of the liquid mixture in said step (C) is carried out for the liquid mixture held in said liquid mixture holding portion, wherein evaluating the liquid amount of the liquid mixture in said step (C) includes detecting whether a liquid level of the liquid mixture in the liquid mixture holding portion matches a predetermined liquid level or whether the liquid mixture is present in the liquid mixture holding portion.

5. The method according to claim 1, wherein said liquid-reagent-containing microchip further includes two or more second measuring portions for measuring said two or more types of liquid reagents respectively and a second mixing portion for mixing the two or more types of liquid reagents measured with said second measuring portions, and evaluation of the liquid amount and quality of the liquid mixture in said step (C) is carried out for the liquid mixture containing said two or more types of liquid reagents obtained as a result of measurement with said second measuring portions and mixing in said second mixing portion, wherein evaluating the liquid amount of the liquid mixture in said step (C) includes detecting whether a liquid level of the liquid mixture in the second mixing portion matches a predetermined liquid level.

6. A liquid-reagent-containing microchip utilizing centrifugal force to analyze or test a sample, the microchip comprising:

two or more reagent holding portions for holding two or more types of liquid reagents respectively;

two or more first measuring portions for measuring said two or more types of liquid reagents respectively;

a first mixing portion for mixing the two or more types of liquid reagents measured with said first measuring portions;

a detection portion connected to said first mixing portion via a flow path, for analyzing or testing a liquid mixture obtained as a result of mixing; and a liquid mixture holding portion coupled to the flow path connecting said first mixing portion and said detection portion to each other, for evaluating a liquid amount and quality of said liquid mixture, wherein evaluating the liquid amount of the liquid mixture is performed by detecting whether a liquid level of the liquid mixture in the liquid mixture holding portion matches a predetermined liquid level or whether the liquid mixture is present in the liquid mixture holding portion.

7. A liquid-reagent-containing microchip utilizing centrifugal force to analyze or test a sample, the microchip comprising:

two or more reagent holding portions for holding two or more types of liquid reagents respectively;

two or more first measuring portions for measuring said two or more types of liquid reagents respectively;

a first mixing portion for mixing the two or more types of liquid reagents measured with said first measuring portions;

two or more second measuring portions for measuring said two or more types of liquid reagents respectively; and a second mixing portion for mixing the two or more types of liquid reagents measured with said second measuring portions and evaluating a liquid amount and quality of an obtained liquid mixture, wherein evaluating the liquid amount of the liquid mixture is performed by detecting whether a liquid level of the liquid mixture in the second mixing portion matches a predetermined liquid level.

* * * * *